UNITED STATES PATENT OFFICE.

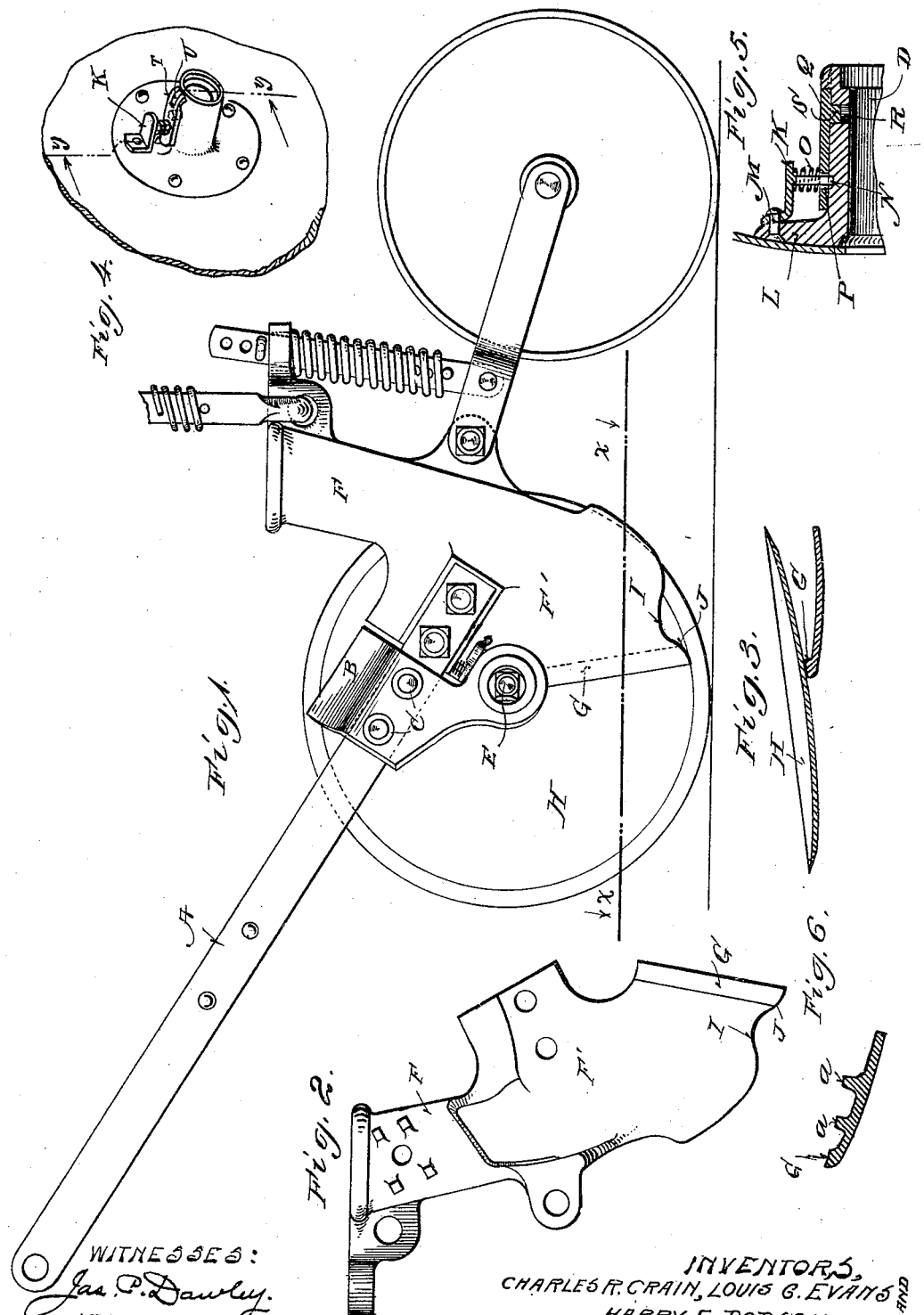

CHARLES R. CRAIN, LOUIS C. EVANS, AND HARRY E. DODSON, OF SPRINGFIELD, OHIO, ASSIGNORS TO THE P. P. MAST & COMPANY, OF SAME PLACE.

GRAIN-DRILL.

SPECIFICATION forming part of Letters Patent No. 641,498, dated January 16, 1900.

Application filed February 18, 1899. Serial No. 705,968. (No model.)

*To all whom it may concern:*

Be it known that we, CHARLES R. CRAIN, LOUIS C. EVANS, and HARRY E. DODSON, citizens of the United States, residing at Springfield, in the county of Clark and State of Ohio, have invented certain new and useful Improvements in Grain-Drills, of which the following is a specification, reference being had therein to the accompanying drawings.

This invention relates to certain new and useful improvements in grain-drills; and the particular feature of such machine to which our invention directly refers is a combined furrow-opening and seed-delivering device.

The objects of our invention are, first and principally, to remove, essentially, all of the adhering soil or earth from that side of the furrow-opening disk next to the wing or shield of the seed-delivering device, and so to exclude such earth or soil from admission into the space between the disk and wing or shield, and, secondly, to provide a clearance-space between the disk and wing or shield immediately back of the rear contact-line of the disk and wing or shield, it being the purpose of our invention to successfully perform these functions in damp or comparatively wet and soggy soil.

We are aware that it is old to construct wings or shields so that merely their forward edge will stand close to the side of the disk and will conform to the outline of the disk radially or nearly radially and that in such cases the wing would generally, certainly to some extent, remove much of the soil from the disk, particularly if the ground was in a normal seeding condition; but in all such cases two defects have existed: First, the operation of removing the soil has been so imperfect that the disks have remained heavily coated with the soil back of the essentially radial contact-line between the disk and wing, such soil having passed such contact-line and gotten into the seed-space between the disk and wing. The effect of this was to gradually coat the inside surface of the wing with this soil so carried in, the coating being kept up as the implement continued its work until in a short time the coating became so thick that it filled more and more and finally essentially closed up the grain-space between the wing and disk, and thereby impeded the passage of the grain to an extent that either made the seeding too thin or stopped it altogether, requiring the operator to clean out the seed-space from time to time. The defective operation of these old devices here described was particularly pronounced in soil in a wet, soggy, or sticky condition. It is our purpose to overcome this defective operation above described and to provide a furrow-opening and seeding device which will not be subject to such defect, even in soil in a wet, soggy, and sticky condition.

The first and principal general object above stated is carried into effect by forming or supplying the forward edge of our wing or shield with a contact-surface extending not only along a radial or essentially radial line, but, in addition thereto, along a horizontal or essentially horizontal line, such contact-surface conforming to the outline of the disk, and while not fitting against the disk so hard as to create undue friction, and thus add to the distress of the draft-animals, being still in such intimate relation to the disk as to leave the barest and most attenuated film of space defined by what might be called "delicate" contact with the disk, running from the forward edge of the wing or shield, thence rearwardly and essentially horizontally, thus leaving or producing between such surface and the disk a film of space in width or latitude, but a passage or space of great length or longitude.

A second object of our invention is carried into effect by dropping away the interior wall of the wing or shield from or immediately next to the rear edge of such contact-surface, so as to leave a clearance-space immediately to the rear or behind this edge, so that the soil which, though small in quantity, works through such passage will yet have space through which it may fall away and down to the ground without being crowded against the inner surface of the shield or wing.

Thus it will be seen that, functionally speaking, the first feature of our invention, while avoiding excessive friction, with its objectionable increase of draft and wearing of parts, yet removes so nearly all of the adhering earth from the disk that only the least quantity passes, while to allow the escape of this small quantity the clearance-space is provided.

The third feature of our invention is to provide the shield with a construction which prevents the clogging at the grain-outlet, so that it will operate in all kinds of ground, particularly in damp and sticky ground, in a satisfactory manner. This object is carried out by means of a notched or cut-out portion along the lower edge of such shield where the grain passes between the disk and shield into the furrow.

This invention also relates to an improved oil-cap for keeping the oil-holes in the disk-journal free from dirt.

Our invention also relates to details of construction and arrangement hereinafter appearing, and particularly pointed out in the claims.

In the accompanying drawings, on which like reference-letters indicate corresponding parts, Figure 1 is a side elevation of a furrow-opening disk, covering-wheel, and our invention used in conjunction with said disk. Fig. 2 is a detail perspective interior view of our improved boot entire; Fig. 3, a sectional view through the furrow-opening disk and our improved shield, the section being taken on the line $xx$ of Fig. 1, looking in the direction of the arrows; Fig. 4, a partial perspective view of the furrow-opening disk and its bearing-sleeve with our improved oil-cap applied thereto; Fig. 5, a detail sectional view of the same, the section being taken on the line $yy$ of Fig. 4, looking in the direction of the arrows; and Fig. 6, a detail view showing three scraping devices applied to the shield.

The letter A represents a drag-bar to which is secured a clip B by means of bolts C. This clip acts as a support for the disk-bearing, consisting of a sleeve D, mounted on a bolt E, passing through the sleeve and clip. To the lower end of the drag-bar and adjacent to the lower edge of the clip is bolted a boot F, having its lower portion formed into a shield F' and embodying the principal features of our invention.

It will be seen that the forward edge of our wing or shield is provided with a contact-surface G in contact or substantially in contact with the convex side of the disk H and extending not only along a radial or essentially radial line, but, in addition thereto, along a horizontal or essentially horizontal line, such contact-surface conforming to the outline of the disk, and while not fitting against the disk so hard as to create undue friction is still in such intimate relation thereto as to have but a film of space between them. Immediately in the rear of this contact-surface the shield preferably drops away from the disk, so that a pronounced clearance-space is formed, whereby such thin attenuated soil as may adhere to the disk when it reaches the inner edge of this contact-surface breaks up into fine parts and drops down with the seed through said clearance-space and enters the seed-furrow instead of adhering to the disk and shield and crowding and filling between it and the shield, as would be the case in the absence of such clearance-space. Thus it will be seen that two improved functions are performed by this peculiar and novel shield and by its relation to the disk—namely, first, the function of removing the greater portion of the soil adhering to the disk, and, secondly and particularly, the function of permitting or causing the remaining adhering soil to readily fall away and escape from the disk after the scraping function is performed, such clearance-space permitting this dislodgment and falling away of such remaining soil without the possibility of the same crowding or lodging between the disk and shield, which soil in older structures would continue to adhere to the disks and gradually collect on the inner side of the shield, because it had no means of escape and was not drawn or attenuated by said contact-surface. Again, the great length of the contact-surface horizontally compared with the thin film of space allows very little earth to get past, as such earth is so reduced that only a small quantity reaches the clearance-space.

While we have shown but one contact-surface, still we wish it to be understood that it is within our invention to employ a succession of such surfaces with a space between them, as illustrated in Fig. 6. The lower end of the spaces or passages $a$ are opened to permit the soil to drop down, the same as in the other form. Thus, aside from preventing the accumulation of soil and clogging between the disk and shield, the disk is kept clean, so that it will operate more easily.

Passing now to the third feature of our invention—namely, the construction which will prevent the space between the shield and disk from clogging along their lower edges and from filling with soil, so that the grain will be prevented from dropping regularly into the seed-furrow—it will be seen that such edge of the wing is notched, as shown at I. In the illustration such notched-out portion commences near the lower forward end or toe of the shield and extends rearward and upward. When the disk is lowered into very sticky soil, the lower end of the boot and, in fact, the lower end of the grain or hopper tube, which in practice projects within the boot to a considerable extent, become filled with soil, and unless at once removed the grain will fill the grain-tube or the space between the disk and shield and cause a skip in the drill-row. By reason of the lower edge of the shield being notched or cut out all this is prevented, because as the disk travels rearwardly from the edge J of the notched or cut-out portion the sticky soil is torn from its support along one side and immediately falls down within the furrow along with the falling seed. Thus this feature of our invention is particularly useful, especially in the early springtime, as few fields are free from sticky spots, where the disks are liable to sink in more or less and where they will easily become clogged in the absence of this feature.

Referring now to the improved covers for the oil-hole leading into the journal of the furrowing-disk, it will be seen that a bracket K is secured to the flange-sleeve L by means of a rivet M. This bracket has projecting therefrom a stud N, adapted to have a spring O coiled about it and to extend through a hole P in a cover Q and into a depression in said sleeve. Thus the cover may be raised on the stud N at pleasure, but is normally held seated by said spring. In order to keep the oil-hole R free from dirt and also to assist in retaining the cover over said oil-hole, we provide a lug S, which projects within said oil-hole, the cover being additionally held in place by reason of the bifurcated end T engaging with a raised portion U, extending from the outer end of the sleeve L. Thus with this device there is no danger of losing the covers, and the oil-holes will always remain closed when the machine is in operation, so that no dirt may enter.

Having thus fully described our invention, what we claim as new, and desire to secure by Letters Patent, is—

1. In a furrow-opening device, the combination with a revoluble journaled disk, of a shield or wing having along its forward edge a surface conforming to the disk and in such relation thereto as to constitute slight contact, as defined, thereby leaving only a most attenuated space in width along the vertical direction of said surface, but of great comparative length along the horizontal direction of said surface, the inner side of the shield or wing from the rear edge of said surface dropping away so as to form the clearance-space, as described.

2. In a combined furrow-opening and seed-delivering device, the combination with a journaled disk, of a boot working in conjunction with said disk, and means connected with the forward edge of the lower part of said boot for scraping and breaking up the earth clinging to the side of the disk adjacent to the boot, such means back of the scraping features receding from the disk to form a clearance-space for the descent of the broken soil.

3. In a combined furrow-opening and seed-delivering device, the combination with a journaled disk, of a boot having a wing working in conjunction with said disk, and a scraping device, connected with the forward edge of said wing, the wing dropping away abruptly from the inner edge of said scraping device, substantially as shown and described.

4. In a combined furrow-opening and seed-delivering device, the combination with a journaled disk, of a boot having a wing working in conjunction with said disk, scrapers, having abrupt rear edges, connected with the forward inner portion of said shield, and adapted to scrape and break the soil, clinging to said disk adjacent to said wing, substantially as shown and described.

5. In a combined furrow-opening and seed-delivering device, the combination with a journaled disk, of a boot having a wing working in conjunction with said disk, and conformed to its shape along the wing's forward edge, said wing having a notch therein back of its forward edge, substantially as shown and described.

6. In a combined furrow-opening and seed-delivering device, a boot having a wing connected therewith and having a scraping device along its forward edge and a notched or cut-away portion in its lower edge, substantially as shown and described.

7. In a combined furrow-opening and seed-delivering device, the combination with a journaled disk, of a boot having a wing working in conjunction with said disk and conforming to the shape thereof along its forward edge, a scraping device having its inner edge raised from said wing, said wing being constructed to also release the soil from its grain-delivery opening, substantially as shown and described.

8. In a combined furrow-opening and seed-delivering device, the combination with a journaled disk, of a boot having a wing working in conjunction therewith, and having its lower contour shaped to release the soil, which crowds into the grain-delivery passage, from such passage, when the disk rotates.

9. In a combined furrow-opening and seed-delivering device, the combination with a bracket carrying a stud, an oil-hole covering pivoted upon said stud and an interposed spring between said bracket and cover, whereby the cover is held closed.

10. In a combined furrow-opening and seed-delivering device, the combination with a bracket carrying a stud adapted to extend within a hole or depression in the bracket-support, of an oil-hole cover pivoted upon said stud and having a lug projecting therefrom adapted to fit in the oil-hole, substantially as shown and described.

11. In a combined furrow-opening and seed-delivering device, the combination with a bracket carrying a stud adapted to extend within a hole or depression to support its free end, of an oil-hole cover pivoted upon said stud and having a lug for fitting within the oil-hole and having its outer end bifurcated to fit over a projection, and an interposed spring on said stud between the cover and bracket for holding said cover in position, substantially as shown and described.

In testimony whereof we affix our signatures in presence of two witnesses.

CHARLES R. CRAIN.
LOUIS C. EVANS.
HARRY E. DODSON.

Witnesses:
C. C. KIRKPATRICK,
J. SHAW.